No. 737,061.

Patented August 25, 1903.

UNITED STATES PATENT OFFICE.

ARON M. BEAM, OF DENVER, COLORADO, ASSIGNOR TO THE BEAM CONVERTING FURNACE COMPANY, A CORPORATION OF COLORADO.

PROCESS OF RECOVERING PRECIOUS METALS.

SPECIFICATION forming part of Letters Patent No. 737,061, dated August 25, 1903.

Application filed May 12, 1899. Serial No. 716,599. (No specimens.)

*To all whom it may concern:*

Be it known that I, ARON M. BEAM, a citizen of the United States, residing in Denver, in the county of Arapahoe and State of Colorado, have invented a new and useful Improvement in Processes of Recovering Precious Metals from Refractory or Rebellious Ores, of which the following is a specification.

My invention relates to the art of treating refractory or rebellious ores—that is to say, ores in which the gold and other precious metals are not found in a free state or what is commonly known as a "free-milling" condition, such ores being generally termed "sulfid," "tellurid," or "arsenid" ores, from the fact that they contain sulfur, tellurium, arsenic, and other substances, or compounds thereof, in a crystalline form or non-soluble condition, which renders it impossible to separate the gold or precious metals in the ores by amalgamation, even though the ore be finely ground or pulverized; and my invention relates more particularly to certain improvements upon the process or invention set forth and described in my companion application, Serial No. 716,597, of even date herewith. The gold and other precious metals in such ores have heretofore been imperfectly or partially extracted and recovered by tedious and costly processes, involving a great amount of time and labor and great expense for fuel and costly chemicals, the processes heretofore most commonly in use involving a costly desulfurizing roasting operation in which the ore is subjected for many hours—from six to sixty hours—to a high heat, ordinarily from 1,000° to 2,400° Fahrenheit, in connection with a costly chemical treatment by chlorination or cyaniding. In the old processes the roasting operation, which is continued for many hours at a high heat and generally in a reverberatory, calcining, or other furnace, in which the flame or products of combustion of the fuel are carried over the ore, is for the purpose of burning and driving off the sulfur, arsenic, antimony, and other refractory elements, and it frequently causes a loss of a material percentage of the gold or precious metals in the ore, the same being carried off in the products of combustion or vapors generated either in the form of vapor or of exceedingly small particles, and even after such slow, costly, and laborious treatment only from eighty to ninety per cent. of the gold and other precious metals in the ores after roasting are recovered, and the tailings require then to be concentrated and smelted, the concentrating and smelting, however, only recovering a percentage of the precious metals left in the tailings. In the old processes also the zinc, lead, and copper in the ore cannot be recovered, and many ores containing precious metals frequently have a material value in lead, zinc, or copper, or one or more of these, and where an ore contains even as high as one per cent. of copper the cyanid process, which is the cheaper of the processes heretofore commonly in use, is not and cannot be practically used. The processes previously used for treating rebellious or refractory ores, therefore, have not heretofore been practicable upon anything except high-grade or medium-grade ores, as the cost of the treatment itself exceeds the value of what are commonly termed "low-grade" ores, or those not running above ten dollars or twelve dollars per ton.

The object of my invention is to provide a simple, cheap, and efficient process for treating refractory or rebellious ores by means of which the gold and other precious metals contained therein may be substantially all recovered without loss and by which high-grade, medium-grade, and low-grade ores may all be successfully treated and by means of which also the zinc, lead, and copper values of the ore may also be saved, and more particularly by means of which antimonial ores or ores containing antimony in appreciable quantities may be successfully treated.

In practicing the invention or process set forth and described in my said companion application I have found or discovered that with certain ores, especially antimonial ores or ores containing a substantial percentage of antimony, the amalgamation of the gold or precious metals is very greatly facilitated by subjecting the converted ore after it comes from the closed oven or muffle to a second or further pulverizing step or action. By this simple change in or addition to my said process I find that I can treat antimonial ores with the same success as others.

My present or improved process therefore consists, essentially, in the following steps: first, pulverizing the ore from forty to eighty mesh; second, subjecting it, in connection with a suitable flux or reagent added thereto for a period of from fifteen minutes to one hour, according to the character and composition of the ore, to the action of a low degree of indirect heat, while the air is excluded, the heating being done in a closed oven or muffle at a temperature of from 250° to 500° Fahrenheit, which operates to begin to change or partially change the sulfids of the base metals into soluble sulfates without burning the sulfur or causing any cementation or coating of the ore particles with residuum of sulfur; third, I next after the conversion of the sulfids of the base metals into sulfates is well under way or so far advanced that now the admission of air or oxygen will not cause burning of the sulfur or cementing or coating of the ore particles with residuum of sulfur, which would prevent amalgamation and defeat my process, admit fresh air, preferably in a heated condition, to the ore in the closed oven or muffle for a period of from fifteen minutes to one hour, which supplies the necessary oxygen to complete the conversion of the sulfids of the base metals into soluble sulfates and to leave the gold in a free condition capable of ready amalgamation in the ordinary way and the silver either in a free condition or in the form of a low sulfid, so that it may be easily saved by amalgamation or concentration. The converted ore is next removed from the furnace and subjected to a further grinding or pulverizing action, which serves to facilitate the subsequent or amalgamating step. Fifth, the converted and reground ore is next (the necessary amount of water being added) subjected to an amalgamating action or treatment and from eighty to ninety per cent. of the gold and a greater or less per cent. of the silver separated and recovered, the ore during this step being kept from contact with metallic iron, the presence of which would set up a galvanic action that would tend to interfere with or prevent amalgamation of the gold; sixth, the ore and water after passing over the amalgamating-plates are next passed to concentrating-tables, and the remaining gold and silver, and also the lead, if the ore has contained lead in sufficient quantities to make it desirable to save it and which after the conversion is now chiefly in the form of an oxid, is collected as a concentrate; seventh, I next, if the ore has contained copper or zinc in sufficient quantities to make it desirable to save them, recover the same by separating the soluble sulfates of zinc and copper from the insoluble portions of the ore, the copper and zinc after conversion in the closed oven or muffle being in the form of soluble sulfates and forming a solution with the water used in the amalgamating and concentrating steps; eighth, collecting the zinc and copper by precipitation, and, ninth or finally, the concentrate, if it contains not enough lead to make it worth saving, is reground and put a second time through the same operations, being preferably added to the fresh ore to be treated, as otherwise sulfur would be required to be added to it, or if the ore contains a sufficient amount of lead to make it desirable to save it it is then remelted to recover the remaining gold and silver and the lead.

The ore after being pulverized and before being placed in the closed oven or muffle for the heating step is preferably subjected to a drying or preliminary heating step of about 212° Fahrenheit until the ore is brought up to a temperature of 200° or 212° Fahrenheit. The flux or reagent is preferably added to and mixed with the ore at this time and before the ore is passed into the closed oven or muffle. The character and composition of the flux or reagent will vary with the particular character and composition of the ore being treated. It is ordinarily composed of carbon, fused common salt, (anhydrous sodium chlorid,) nitrate of soda and silica, the proportions of the ingredients varying with the ore. By "fused common salt" I mean common salt from which the water of crystallization has been driven off by heat. I use fused salt as contradistinguished from common salt to prevent the formation of chlorin gas or other injurious action. If the ore contains a sufficient quantity of zinc to make it desirable to save it, I substitute as an oxidizing salt carbonate of potash as an equivalent for the nitrate of soda, and if the copper in the ore is desired to be saved I substitute as an oxidizing salt carbonate of ammonia as an equivalent for the nitrate of soda, as the nitrate of soda would prevent the zinc and copper from forming perfect soluble sulfates. If the ore is deficient in sulfur, sulfur is added to the flux or reagent. The several substances comprising the flux or reagent are mixed together and preferably pulverized to the same degree of fineness as the ore before mixing the same with the ore. The quantity of flux or reagent to be added to and mixed with the ore varies with the particular character and composition of the ore. Ordinarily it is from one to five pounds per ton, outside of the carbon, which is generally from three to twelve pounds per ton. The proportions of the ingredients in the flux or reagent will vary greatly with the character and composition of the ore. The proportions, however, for an ordinary ten-per-cent. sulfid ore would be approximately sixty-eight per cent. carbon, twenty-two per cent. fused salt, eight per cent. nitrate of soda or its equivalent, and two per cent. silica. In preparing the flux or reagent the salt and silica are fused together with what carbon they will take up to saturation. Then the mixture of salt and silica is pulverized and then mixed with the pulverized nitrate of soda and the balance of the carbon. The pulverizing flux or reagent is then ready to be mixed with the ore.

After the conversion of the ore is completed and the gold and precious metals reduced to a free-milling or amalgamating condition it will be found that in many cases the ore has very nearly doubled in volume, owing to the spongy porous flocculent condition into which it has been changed by the conversion steps of my process. It will also be found that the ore in many cases after conversion is of substantially the same weight as before, this being in part due to the fact that the sulfur instead of being burned out or expelled, as in the old desulfurizing processes, is largely simply converted from a sulfid to a sulfate form, the sulfur ingredients in the ore being utilized in the chemical change or conversion that takes place in the ore. The fact that the ore remains substantially the same weight after conversion as before is also, I believe, in part due to the absorption of oxygen during the period when the air is admitted to the ore, the weight lost by the escape of the fugitive gases being largely replaced by the oxygen from the air admitted.

In the practical operation of my process, in order to determine with certainty when the conversion of the sulfids of the base metals into sulfates has been sufficiently well advanced to make it safe to admit air to the ore or muffle without danger of causing combustion of the sulfur and cementation or coating of the ore particles with residuum of sulfur, I test the ore being heated in the closed muffle from time to time. This may be done by inserting through an eye-hole in the furnace a red-hot iron rod into the ore. If the ore clings to the hot iron rod, the step of heating in the closed muffle while the air is excluded has not been continued long enough. If, on the other hand, the ore will not stick to the hot iron, it is ready for the next step or the admission of fresh air in a heated condition to the ore to complete the conversion. Another test which may be used for this purpose is to admit a small quantity of air to the ore through the eye-hole. If the small particles of ore that come in contact with the air thus admitted are seen to form slight explosions over the bed of the ore, the heated step in the closed muffle has not been continued long enough and must be carried farther. If, on the other hand, the admission of the air causes no such explosions or "little volcanos" over the bed of the ore, the second step of the process is completed, and the air may be admitted.

In treating by my process ores which contain no copper or zinc, or so little as to make it undesirable to save the same, the sixth or leaching and precipitation step of the process is omitted.

In treating by my process ores which contain no lead, or so little as to make it undesirable to save it, I prefer, instead of smelting the concentrates to recover the remaining gold and silver left in the ore after the amalgamation step, to subject the concentrates a second time to the process, as I find that by so doing substantially all the gold and precious metals in the concentrates may be thus recovered, and is thus cheaper and better than smelting. In thus treating the concentrates to recover the remaining gold and silver they are preferably reground, mixed with the necessary flux or reagent, to which sulfur is to be added if the concentrates are treated alone or without an admixture of fresh ore, and they are then subjected to the action of heat in a closed oven or muffle and then to the amalgamating step, as before described, when substantially all the gold and precious metals will be recovered.

Before treating any particular ore by my process the particular composition and proportion of ingredients of the flux or reagent to be added thereto to produce the best results is first accurately determined by analysis and by tests with small quantities of the ore. The fused common salt used in my process may be chemically defined as "anhydrous sodium chlorid."

I claim—

1. The process of treating refractory or rebellious ores for recovery of precious metals, consisting in first pulverizing the ore; second, subjecting it, in connection with a suitable oxidizing flux or reagent mixed therewith, in a closed oven or muffle, to the action of a low degree of indirect heat while the air is excluded for a short time, until the sulfids of the base metals are partially converted into sulfates, so that air may be afterward admitted without burning the sulfur or causing cementation or coating of the ore particles with sulfur or other residuum; third, admitting air to the ore in the muffle and completing the conversion of the sulfids of the base metals into sulfates and the releasing of the gold or precious metals to a free or amalgamating condition by subjecting the ore for a further short time to a low degree of indirect heat, then regrinding or repulverizing the converted ore, and then separating the gold and precious metals from the ore by amalgamation, substantially as specified.

2. The process of recovering precious metals from refractory or rebellious ores, consisting in first pulverizing the ore; second subjecting it in connection with a flux or reagent composed of carbon, anhydrous sodium chlorid, an oxidizing salt and silica mixed therewith in a closed oven or muffle to the action of a low degree of indirect heat while the air is excluded for a short time, or until the sulfids of the base metals are partially converted into sulfates, so that air may be afterward admitted without burning the sulfur or causing cementation or coating of the ore particles with sulfur or other residuum; third admitting air to the ore in the muffle and completing the conversion of the sulfids of the base metals into sulfates and the releasing of the gold or precious metals to a free or amalgamating condition by subjecting the ore for a further short time to the action of a low degree of heat without burning the sulfur; then regrinding the converted ore; and collecting the precious metals from the ore by amalgamation, substantially as specified.

ARON M. BEAM.

Witnesses:
EDMUND ADCOCK,
H. M. MUNDAY.